United States Patent
Merriman

(10) Patent No.: US 11,106,538 B2
(45) Date of Patent: Aug. 31, 2021

(54) SYSTEM AND METHOD FOR FACILITATING REPLICATION IN A DISTRIBUTED DATABASE

(71) Applicant: MongoDB, Inc., New York, NY (US)

(72) Inventor: Dwight Merriman, New York, NY (US)

(73) Assignee: MongoDB, Inc., New York, NY (US)

(*) Notice: Subject to any disclaimer, the term of this patent is extended or adjusted under 35 U.S.C. 154(b) by 654 days.

(21) Appl. No.: 15/177,001

(22) Filed: Jun. 8, 2016

(65) Prior Publication Data

US 2016/0371156 A1    Dec. 22, 2016

Related U.S. Application Data

(60) Provisional application No. 62/180,232, filed on Jun. 16, 2015.

(51) Int. Cl.
| | |
|---|---|
| G06F 11/14 | (2006.01) |
| G06F 16/23 | (2019.01) |
| G06F 11/20 | (2006.01) |

(52) U.S. Cl.
CPC ...... G06F 11/1448 (2013.01); G06F 16/2308 (2019.01); *G06F 11/2094* (2013.01); *G06F 11/2097* (2013.01); *G06F 2201/82* (2013.01)

(58) Field of Classification Search
CPC .................................................. G06F 11/1464
See application file for complete search history.

(56) References Cited

U.S. PATENT DOCUMENTS

| | | | |
|---|---|---|---|
| 7,797,304 B2* | 9/2010 | Muralidhar | G06F 16/84 707/713 |
| 9,208,032 B1* | 12/2015 | McAlister | G06F 11/1435 |
| 10,481,982 B2 | 11/2019 | Merriman | |
| 2003/0167458 A1* | 9/2003 | Santhanam | G06F 8/41 717/114 |
| 2012/0159459 A1* | 6/2012 | Turner | G06F 8/314 717/138 |
| 2013/0145085 A1* | 6/2013 | Yu | G06F 12/0246 711/103 |
| 2013/0290249 A1* | 10/2013 | Merriman | G06F 17/30578 707/610 |
| 2015/0046673 A1* | 2/2015 | Barry | G06F 9/30036 712/7 |
| 2016/0070589 A1* | 3/2016 | Vermeulen | G06F 9/466 711/153 |
| 2016/0371155 A1 | 12/2016 | Merriman | |

OTHER PUBLICATIONS

Malcolm, Algebraic Data Types and Program Transformation. Doctoral Thesis. University of Groningen. Sep. 14, 1990. 120 pages.

* cited by examiner

*Primary Examiner* — Mark D Featherstone
*Assistant Examiner* — Tony Wu
(74) *Attorney, Agent, or Firm* — Wolf, Greenfield & Sacks, P.C.

(57) ABSTRACT

According to one aspect, a distributed database system is configured to manage multi-writer operations on a distributed database by implementing one or more catamorphic database operators. Catamorphic operators can be architected on the system, and executed with little or no reconciliation logic. Catamorphic operators define sets of catamorphic operations and respective execution logic where the order of execution of catamorphic operations is not relevant to a final result.

20 Claims, 6 Drawing Sheets

```
(write)( )
   (process < write >
      (catch write function
         . . .
      (check multiwriter target
         (parse data request  // identify data target
            . . .
            match metadata  // determine responsible nodes
            . . .
            check <states> multiwrite<<   //  multiwrite enabled?
                  if no         route    < primary > //   use primary
                                                     //node from metadata
                  if yes      then    valid( )//  catamorphic operation?
            Valid( )
               (test <operation>            // valid catamorphic op?
                  if  match   then   route ( )
                  else  return     error       )

route ( )
             ( identify   <write nodes>          // from metadata
               select( ) <node>                  // admin specified
                  <select setting>               // selection algo
                     L.R.U.( )                   // select least recently used node
                     Availability( )             // select greatest availability node
                     Load( )                     // select least load
                         .                           .
                         .                           .
                         .                           .
               comm <write> @ <selected node>
            (
   (
```

FIG. 4

SYSTEM AND METHOD FOR FACILITATING REPLICATION IN A DISTRIBUTED DATABASE

RELATED APPLICATIONS

This application claims priority under 35 U.S.C. § 119(e) to U.S. Provisional Application Ser. No. 62/180,232 entitled "SYSTEM AND METHOD FOR FACILITATING REPLICATION IN A DISTRIBUTED DATABASE," filed on Jun. 16, 2015, which application is incorporated herein by reference in its entirety.

BACKGROUND

As databases architectures have grown more sophisticated and client demand for services has increased, the need to provide additional processing power has grown. Further, data availability requirements have greatly increased in conjunction with the need for processing power. Various conventional database systems address scalability through scaling of resources and distribution of operations. For instance, scaling of resources may be achieved, for example, by providing multiple copies of database instances where multiple copies of each database instance are able to process read and/or write operations. Distribution of database operations can include distribution of read operations to ensure high data availability. Distribution of write processing to multiple systems capable of performing write operations is often referred to as "multi-master" databases. Multi-master or multi-writer databases are able to provide high or even 100% write availability by handling client writes requests across any number of systems or processing nodes (e.g., a processing entity hosting a portion of the database data) in a distributed database. Unfortunately, distribution of write requests incurs significant issues associated with reconciling the distributed write operations that occur throughout the database.

In some conventional implementations, eventual consistency models are used to minimize issues with reconciling distributed write operations. However, even with eventual consistency models (and informal data consistency guaranties) distributed write operations pose significant problems. For example, some approaches implement sophisticated reconciliation logic to order writes executed on different systems within a distributed database or to select specific systems to handle each write operation. Other examples of conventional database systems implement versioning controls on the database data or documents containing the data. In one example, multiversion concurrency control (MVCC) is implemented to ensure consistency of the data across multiple systems or processing nodes that accept write operations.

SUMMARY

According to some aspects, it is realized that conventional reconciliation logic and versioning control overly complicates implementation of multi-writer distributed database systems. According to another aspect, the complexities and issues associated with conventional multi-writer approaches can be avoided. In one embodiment, implementation on a distributed database of a set of well-defined promotions for operations on specific data types enables a multi-writer environment where multi-writer operations can be executed with eventual consistency guaranties. It is further realized that reducing the complexity of data reconciliation in multi-writer databases improves the operation of the overall database system, increasing efficiency, speed, and scalability. In some examples, well-defined promotions between data types facilitates data replication, delivers minimization of reconciliation logic, and improves the availability and capability of any database system. For example, minimizing reconciliation logic executed by multi-writer nodes in the database system reduces the computational requirements for the distributed database over various conventional approaches.

According to one aspect, a distributed database system is configured to manage multi-writer operations on a distributed database by implementing one or more catamorphic database operators. Catamorphic operators can be defined on the database system (including, for example, specifying an operator, command inputs, command outputs, execution logic, etc.) and can be executed with little or no reconciliation logic. According to one embodiment, to achieve catamorphic property the system limits or restricts the universe of database operations that are available in conventional databases to the well-defined promotions and selected operations that can be executed irrespective of order and return an eventually consistent result.

In one embodiment, catamorphic operators define sets of catamorphic operations and respective execution logic associated with well-defined promotions through a set of data types. In one embodiment, multi-writer operations are executed on a group of nodes hosting at least a copy of a portion of the distributed database. Each node can host a writable copy of the data (e.g., when executing a catamorphic operation) and then replicate the operation to the other nodes of the group. Under an eventual consistency model the order of execution of the catamorphic operations becomes irrelevant. Some reconciliation can be implemented to ensure that unique operations are only executed once (e.g., globally unique identifiers can be assigned to operations to ensure the database does not execute the same operation twice).

According to another aspect, the catamorphic operations can be defined so that the order of execution of catamorphic operations performed on the database is not relevant to a final result. For example, operations defined on the distributed database using a catamorphic operator "x" can be executed as follows:

```
Example command format (first value) (operator) (second value)
    ( [ ] - value )    (operator)   (string value)   -> (computed result)
    ( within a set)
    first execution
        [ ]            x            "bar"            -> ["bar"]
        ["bar"]        x            "z"              -> ["bar","z"]
    second execution
        [ ]            x            "z"              -> ["z"]
        ["z"]          x            "bar"            -> ["bar","z"] // same result returned
                                                     //regardless of order of execution
```

According to some aspects, catamorphic operators can be defined on the distributed database system, and even with multiple writers (e.g., writes accepted at multiple copies of same database data) and eventual consistency, eventually all of the copies of the database return the same resulting data and do so without complex ordering logic. In some examples, the distributed database can be configured with multiple writers operating on multiple copies of the same database data without any reconciliation logic for ordering operations. In other examples, catamorphic write requests are executed upon receipt at any node hosting a copy of the target data. For example, the write can be executed by a first database node or a first database system receiving the write request. Once executed, replication operations are communicated to other nodes. The replication operations distributed to other write nodes or systems responsible for the same data can be delivered and executed in any order (e.g., at the first node) and still return the same final result under eventual consistency models. In some examples, each write operation can be assigned a globally unique identifier to ensure that each write request is fulfilled once and only once (and then replicated to other nodes) on the distributed database.

In further aspects, configuration settings on a distributed database include permissions for nodes, servers, or database instances having multi-writer capability. Where the database configurations permit multi-writer execution, the database can be configured to restrict operations to one or more catamorphic operators and associated catamorphic operations. In further examples, standard operators identified as catamorphic (e.g., increment, decrement, addition, subtraction, etc.) can also be permitted for multi-writer database instances in addition to the catamorphic operators and well-defined promotions stored on or supplied by the system. In some embodiments, the catamorphic operators define sets of operations on data types and constraints on resulting values for the data types. In one example, a command listing a first data type, an operator, and a second data type defines a command for executing a promotion of one of the first data type to the second data type, the second data type to the first data type, or the first and second to a third data type. In further examples, one of the functions managed by the one or more catamorphic operators include an underlying sequence of promotions of data and data types through defined promotion models. The promotion models can define sequences of data type promotions from a lowest precedence data type to a highest order data type for one or more catamorphic operations.

According to one aspect, a database system for managing distributed write operations is provided. The system comprises at least one processor operatively connected to a memory for executing system components, a database comprising a plurality of database partitions and a plurality of copies of the data in the database partitions, a data routing component executed by the at least one processor configured to determine multiple writer capability for target data, limit execution of write operations for multiple writer data instance to catamorphic operators, select a node for executing the write operation from a group of nodes hosting copies of the same database data, wherein the data routing component is configured to: identify the target data responsive to a received write operation, and communicate the received write operation to the selected node responsive to validation of the operation and multiple writer configuration.

According to one embodiment, the data routing component is further configured to validate write operations received for the target data. According to one embodiment, the system further comprises a replication component configured to replicate executed write operations from the selected node to remaining members of the group of nodes hosting copies of the same database data. According to one embodiment, the system further comprises an administration component configured to enable or disable multi-writer execution on the distributed database. According to one embodiment, the system further comprises an administration component configured to test definition of catamorphic operator. According to one embodiment, the administration component is configured to validate a promotion model associated with the catamorphic operator. According to one embodiment, the data routing component includes a database manager process executing on a system within the group of nodes hosting copies of the target data, and wherein the database manager component selects the node for executing the write operation from the group of nodes hosting copies of the same database data.

According to one aspect, a computer implemented method for managing a distributed database is provided. The method comprises receiving, by at least one processor, from a client a write operation to data on a distributed database, limiting, by the at least one processor, execution of the write operation for one or more multiple writer data instances to catamorphic operators, selecting, by the at least one processor, a node for executing the write operation from a group of nodes hosting copies of the same database data, communicating, by the at least one processor, the received write operation to the selected node responsive to validation of the operation and multiple writer configuration.

According to one embodiment, the method further comprises determining, by the least one processor, multiple writer capability for target data responsive to receiving the write operation. According to one embodiment, the method further comprises validating write operations received for target data within the distributed database. According to one embodiment, the method further comprises replicating, by the at least one processor, executed write operations from the selected node to remaining members of the group of nodes hosting copies of the same database data. According to one embodiment, the method further comprises enabling or disabling multi-writer execution on the distributed database using administrative settings.

According to one embodiment, the method further comprises testing, by the at least one processor, definition of a catamorphic operator. According to one embodiment, the act of testing includes validating a promotion model associated with the catamorphic operator. According to one embodiment, the method further comprises forwarding the write operation to a database manager process executing on a system within the group of nodes hosting copies of the target data, and selecting, by the database manager component, the node for executing the write operation from the group of nodes hosting copies of the same database data.

According to one aspect a database system for managing distributed write operations is provided. The system comprises at least one processor operatively connected to a memory for executing system components, a database comprising a plurality of database instances and a plurality of copies of the data in the database instances, a data routing component executed by the at least one processor configured to determine multiple writer capability for target data, limit execution of write operations for a multiple writer data instance to catamorphic operators, select a node for executing the write operation from a group of nodes hosting copies of the same database data, wherein the data routing component is configured to, identify the target data responsive to a received write operation, and communicate the received write operation to the selected node responsive to validation of the operation and multiple writer configuration.

According to one embodiment, the data routing component is further configured to validate write operations received for the target data. According to one embodiment, the data routing component is further configured to evaluate at least one of: structure of a received write request (e.g., determine structure complies with format specifying: target data, a catamorphic operator, a user operand data type (e.g., where data type can be explicit or implicit (e.g., inferred based on operand value) and a user operand value), target data, operand data, and a catamorphic operator. According to one embodiment, the data routing component is further configured to confirm the operation is mapable to a defined promotion or operation in a promotion hierarchy based on evaluation of at least one of the structure of a received write request, target data, operand data, and a catamorphic operator.

According to one embodiment, the system further comprises a replication component configured to replicate executed write operations from the selected node to remaining members of the group of nodes hosting copies of the same database data. According to one embodiment, the system further comprises an administration component configured to enable or disable multi-writer execution on the distributed database. According to one embodiment, the system further comprises an administration component configured to test definition of catamorphic operator, and optionally configured to validate a promotion model associated with the catamorphic operator. According to one embodiment, the system further comprises a database manager process executing within the group of nodes hosting copies of the target data, and wherein the database manager process is configured to select the node for executing the write operation from the group of nodes hosting copies of the same database data. According to one embodiment, the data routing component is further configured to assign a unique identifier to a received catamorphic write operation. According to one embodiment, the system further comprises a database manager process configured to identify duplicate write operations and prevent duplicate execution.

According to one aspect a computer implemented method for managing a distributed database is provided. The method comprises receiving, by at least one processor, from a client a write operation to data on a distributed database, limiting, by the at least one processor, execution of the write operation for one or more multiple writer data instances to catamorphic operators, selecting, by the at least one processor, a node for executing the write operation from a group of nodes hosting copies of the same database data, communicating, by the at least one processor, the received write operation to the selected node responsive to validation of the operation and multiple writer configuration.

According to one embodiment, the method further comprises determining, by the least one processor, multiple writer capability for target data responsive to receiving the write operation. According to one embodiment, the method further comprises evaluating, by the at least one processor, at least one of: structure of a received write request (e.g., determine structure complies with format specifying: target data, a catamorphic operator, a user operand data type (e.g., where data type can be explicit or implicit (e.g., inferred based on operand value) and a user operand value), target data, operand data, and a catamorphic operator. According to one embodiment, the method further comprises confirming, by the at least one processor, the operation is mapable to a defined promotion or operation in a promotion hierarchy based on the act of evaluating at least one of the structure of a received write request, target data, operand data, and a catamorphic operator. According to one embodiment, the method further comprises validating write operations received for target data within the distributed database.

According to one embodiment, the method further comprises replicating, by the at least one processor, executed write operations from the selected node to remaining members of the group of nodes hosting copies of the same database data. According to one embodiment, the method further comprises enabling or disabling multi-writer execution on the distributed database using administrative settings. According to one embodiment, the method further comprises testing, by the at least one processor, definition of a catamorphic operator, and optionally, wherein testing includes validating a promotion model associated with the catamorphic operator. According to one embodiment, the method further comprises forwarding the write operation to a database manager process executing on a system within the group of nodes hosting copies of the target data, and selecting, by the database manager component, the node for executing the write operation from the group of nodes hosting copies of the same database data. According to one embodiment, the method further comprises assigning, by the at least one processor, a unique identifier to a received catamorphic write operation. According to one embodiment, the method further comprises identifying, by the at least one processor, duplicate write operations and preventing duplicate execution.

According to one aspect a database system for managing distributed write operations is provided. The system comprises at least one processor operatively connected to a memory for executing system components a database comprising a plurality of copies of data hosted on a plurality of database nodes, a data routing component, executed by the at least one processor, configured to, evaluate received write requests, identify a multi-writer operation, responsive to identifying a multi-writer operator within a respective write request, route the write request for execution on one of the plurality of database nodes, a database manager component, executed by the at least one processor, configured to, identify a target data type and operand data type referenced by the multi-writer operation, map the multi-writer operation to a respective function defined within a promotion hierarchy, based on, at least, the target data type and the operand data type identified in the multi-write operation, and execute the respective function on one of the plurality of nodes hosting target data of the multi-write operation.

According to one embodiment, the data routing component is further configured to determine multiple writer capability for the target data of the write request, permit execution of the write request responsive to determining the target data is associated with data configured for multiple writer execution. According to one embodiment, the data routing component is further configured to select a node for executing the multi-writer operation from a group of nodes hosting copies of the same database data. According to one embodiment, each node in the group of nodes is configured to execute multi-writer operations as the multi-writer operations are received. According to one embodiment, each node in the group of nodes is configured to execute multi-writer operations as the multi-writer operations are received irrespective of an order of receipt of the multi-writer operations at respective nodes. According to one embodiment, the data routing component is further configured to assign a unique identifier to a received catamorphic write operation. According to one embodiment, the system further comprises a database manager process configured to identify duplicate write operations and prevent duplicate execution.

According to one embodiment, the system further comprises a user interface component, executed by the at least one processor, configured to generate a user interface displayed to a user, wherein the user interface is configured to accept definition of a multi-writer operation, a plurality of executable promotions between data types in the distributed database, wherein the executable promotions establish an ordering of the data types. According to one embodiment, the system further comprises an administration component configured to test definition of the multi-writer operation. According to one embodiment, the administration component is further configured to execute the plurality of promotions between the data types on test data types and test values to evaluate a final result based on multiple orderings of the plurality of promotions.

According to one embodiment, the system is configured to reject the definition of the multi-writer operations responsive to a failed validation. According to one embodiment, the administration component is further configured to validate coverage of the plurality of executable promotions by testing each data type in at least a multi-writer enabled portion of the distributed database for inclusion in the plurality if executable promotions. According to one embodiment, the administration component is further configure to notify the user of any failed testing and identify in the notification the cause of failed testing. According to one embodiment, the database manager component is further configured to replicate the executed multi-writer operation on remaining nodes hosting copies of the target data the multi-writer operation. According to one embodiment, the database manager component is further configured to replicate write operations received by the distributed database under an eventual consistency model for at least a portion of the data in the distributed database. According to one embodiment, the system is further configured to limit execution of multi-writer operations to at least the portion of the data replicated under the eventual consistency model.

According to one aspect a computer implemented method for managing distributed write operations are provided. The method comprises evaluating, by at least one processor, received write requests for a database comprising a plurality of copies of data hosted on a plurality of database nodes, identifying, by the at least one processor, a multi-writer operation, responsive to identifying a multi-writer operator within a respective write request, routing, by the at least one processor, the write request for execution on one of the plurality of database nodes, identifying, by the at least one processor, a target data type and operand data type referenced by the multi-writer operation, mapping, by the at least one processor, the multi-writer operation to a respective function defined within a promotion hierarchy, based on, at least, the target data type and the operand data type identified in the multi-write operation, and executing, by the at least one processor, the respective function on one of the plurality of nodes hosting target data of the multi-write operation.

According to one embodiment, the method further comprises replicating write operations received by the distributed database under an eventual consistency model for at least a portion of the data in the distributed database, and limiting execution of multi-writer operations to at least the portion of the data replicated under the eventual consistency model. According to one aspect a non-transitory computer-readable medium having computer-readable signals stored thereon that define instructions that, as a result of being executed by a computer, instruct the computer to perform a method for managing distributed write operations is provided. The method comprises evaluating received write requests for a database comprising a plurality of copies of data hosted on a plurality of database nodes, identifying a multi-writer operation, responsive to identifying a multi-writer operator within a respective write request, routing the write request for execution on one of the plurality of database nodes, identifying a target data type and operand data type referenced by the multi-writer operation, mapping the multi-writer operation to a respective function defined within a promotion hierarchy, based on, at least, the target data type and the operand data type identified in the multi-write operation, and executing, the respective function on one of the plurality of nodes hosting target data of the multi-write operation.

Various embodiments of the computer-readable medium execute respective method steps disclosed above, and combination of the respective method steps.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by reference signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIG. 4 illustrates an example pseudo code for selecting a processing node in a multi-writer environment.

DETAILED DESCRIPTION

Figure 1A:
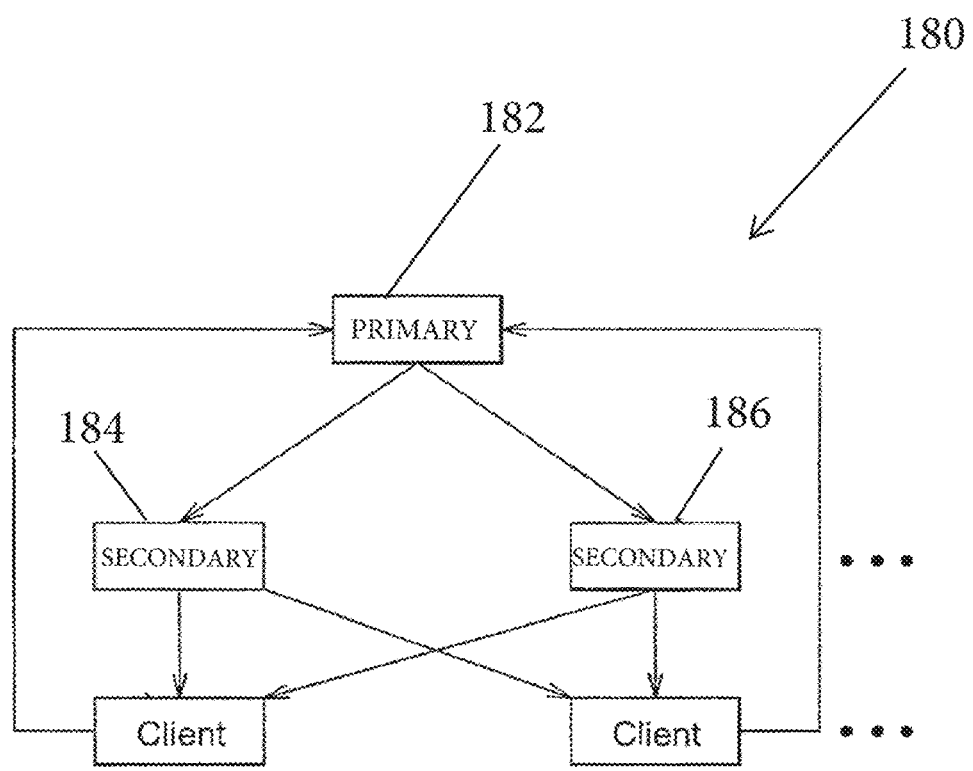
FIG. 1A illustrates a block diagram of an example architecture for a distributed database system, according to aspects of the invention.

According to one aspect, a distributed database system can be configured to minimize overhead associated with scaling of database resources and operations. In various aspects, the distributed database system is configured to provide high availability to database clients in servicing write requests. In some embodiments, the distributed database system is configured to distribute multiple write requests to copies of the same database instance and the same database data, and further minimize any reconciliation and/or operation ordering logic that is conventionally required in multiple writer architectures. In one example, a catamorphic operator is associated with a set of promotion rules and execution logic for operands of specific data types. Each data type occupies a position on a hierarchy of data types, and for each data type in the hierarchy, a combination with another data type yields a well-defined result.

According to various embodiments, the distributed database system is configured to manage multi-writer operations on the distributed database by implementing one or more catamorphic database operators. In one example, each of the one or more catamorphic operators defines a set of catamorphic operations. The catamorphic operations are defined so that the order of execution of catamorphic operations is not relevant to a final result. Thus, under eventual consistency constraints, once write operations cease, all of the writable nodes hosting copies of the same data become consistent (e.g., through replication operations).

In one example, the one or more catamorphic operators provide a well-defined sequence of promotions of data and data types through defined promotion models. The promotion models can define, for example, sequences of data type promotions from a lowest precedence data type to a highest order data type for one or more catamorphic operations. In some embodiments, a highest order data type can include a "tombstone" data type such that the result of any data combined by the catamorphic operator with the tombstone data type yields the tombstone data type. As is known in distributed databases, tombstoning of data is used to mark the deletion of data from distributed data stores, and it is appreciated that a catamorphic operation as discussed herein may be useful for performing such operations.

According to various embodiments, catamorphic operations can be implemented in a variety of distributed database architectures. Operation execution (e.g., write operation) and data replication in multi-writer environments is streamlined, eliminating ordering logic/operations for reconciling operations written to different database nodes/systems in different orders. In one implementation, catamorphic operators are implemented with Replica Sets of the known MONGODB database, to enable multi-writer implementations. For example, replica sets can be implemented with multiple primary nodes that host the same data and each may receive and process write requests that are replicated to other primary nodes and/or secondary nodes. Co-pending U.S. application Ser. No. 15/074,987 filed on Mar. 18, 2016, entitled "METHOD AND APPARATUS FOR MAINTAINING REPLICA SETS," describes examples of replica set implementations that can be augmented to provide multiple writer capabilities and/or nodes groups of nodes, where each node encompasses both primary (e.g., writable) and secondary (e.g. readable) responsibilities for the data each node hosts.

FIG. 1A illustrates a block diagram of an example replica set 180. In one embodiment, a replica set can be composed of one or more sets of nodes responsible for receiving, executing, and replicating write operations throughout a distributed database. In such databases, various roles can be assigned to each node. For example, primary nodes can receive and execute write operations from database clients, and secondary nodes replicate the data hosted on the primary, replicate execution of the write operations on the primary, and elect primary nodes as necessary. In further examples, a distributed database can include arbiter nodes, which do not host data, but can be configured to participate in elections of new primaries when they occur. In further embodiments, replica sets are implemented to provide for data replication for eventually consistent distributed databases. According to one aspect, where the replica set is restricted to a set of well-defined promotions between a specified set of data types implemented on the database, any of the nodes (e.g., primary or secondary) in the replica set hosting data can execute write operations, replicate the write operation to remaining nodes in the set. And eventually each node in the set will have the same result regardless of an order of execution of the write operations and respective replication operation.

According to one aspect, a replica set hosting at least a portion of data for a distributed database can be configured to execute catamorphic operations (e.g., identified by the system through a defined catamorphic operator). Returning to FIG. 1A replica set 180 includes a primary node 182 and at least two secondary nodes 184 and 186. Under conventional implementation primary node 182 would execute write operations received on the database and replicate the operations to the secondary nodes 184 and 186. In an embodiment configured for multi-writers, secondary nodes 184 and 186 can also execute write operations and replicate those operations to primary 182. In one example, each node 182-186 polls operation logs (e.g., reflecting executed write operations) stored on other nodes in the replica set and executes any operations in the logs that have not been performed. Unlike conventional replica sets, nodes 182-186 can perform operations that encompass both primary and secondary node functions. In eventual consistency architectures (i.e., once write operations cease eventually all nodes will host the same data) and under catamorphic constraint, replica sets are implemented with multiple write nodes (e.g., multiple nodes performing primary node functions) that replicate operations to remaining nodes in the replica set.

In some embodiments, client operations are received by a data router (e.g., a data router process or node—not shown in FIG. 1A) that manages delivery of the client request to an appropriate node or replica set hosting data that is the target of the client operation. In some examples, the data router process can be configured to assign a globally unique identifier to the client operation. Assignment of a unique identifier to client requests (and, for example, to client write requests) can be configured to enable respective nodes to identify repeat operations and skip execution of duplicate writes.

In further embodiments, each node executing a catamorphic operation is configured to do so based on the definition of promotion rules and/or definition of the operation for specific operands. To provide an example, a node can receive a first operand that identifies target data (target data is a string data type), an operator that is a catamorphic operator, and a second operand (identifies what data will be used on the target data). The node references execution parameters associated with the catamorphic operator to determine what functional operation is being requested. In this example, data type string (catamorphic operator) data type string is mapped to a function to yield a maximum (first operand, second operand).

For this example, nodes 182 and 184 have no data for the item of interest (item does not yet exist, at least for the node's initial state). The operations are then executed, for the item, on the cluster by clients: (here "x" is a catamorphic operators)

x "dog"
x "cat"

Node 182 receives messages and operates as follows:

```
receive instruction: item (i); operation: x "dog"
execute: null x "dog" -> "dog"  // maps to max(null, "dog")
(secondly)
receive instruction: item (i); operation: x "cat"
execute: "dog" x "cat" -> "dog"  // maps to max("dog", "cat") result "dog"
```

Node 184 receives:

```
receive instruction: item (i); operation: x "cat"
execute: null x "cat" -> "cat"  // maps to max(null, "cat")
(secondly)
Receive instruction: item (i); operation: x "dog"
execute: "cat" x "dog" -> "dog"  // maps to max("cat", "dog") result "dog"
Both nodes 182 and 184 reach the same final state for the data item (i).
```

To provide another example: assume 182, 184, and 186 initial state for a data item (i), which is an empty array. The following operations are received by the replica set (x "bar") and (x "z") where "x" is a catamorphic operator.

Node 182 receives messages and operates as follows:

```
receive: x "bar" on data item (i);     // data item (i) initial state = [ ]
execute: [ ] x "bar" -> ["bar"]        // maps to max([ ], "bar")
(secondly)
receive: x "z"
execute: ["bar"] x "z" -> ["z"]        // maps to max("bar", "z")
```

Node 184 receives:

```
(firstly)
receive: x "z"
execute: [ ] x "z" -> ["z"]            // maps to max([ ], "bar")
(secondly)
receive: x "bar"
execute: ["z"] x "bar" -> ["z"]        // maps to max("bar", "z")
```

Node 186 receives the following, which includes one operation received twice:

```
(firstly)
receive: x "bar"
execute: [ ] x "bar" -> ["bar"]    // maps to max([ ], "bar")
(secondly)
receive: x "z"
```

```
execute: ["bar"] x "z" -> ["z"]    // maps to max("bar", "z")
(then)
*receive: x "bar"    // repeat of "receive: x "bar" above
execute: (duplicate detected -- no operation / skip) // using operation identifier
                                                    // detect duplicate and skip
result: ["z"]
```

End state: all nodes (e.g., 182-186) reach the same final state, ["z"], for the item.

According to one embodiment, "x" is a catamorphic operator that defines execution operations for groups of data types that can be used in a given database, each combination of data types are mapped to an execution function. In the above example, the operands are mapped to a maximization function (e.g., maximum(a,b)) which compares the operands and outputs the maximum value from the comparison. Although in the above example, the maximum function is idempotent making the identification of the duplicate operation and resulting skip non-essential to achieving the final result. In other embodiments, and for example, where the mapped function is not idempotent (e.g., and addition function) detecting duplicate operations becomes necessary to reach a correct result. In other embodiments, the system and/or respective nodes can forgo a duplication check, where the system identifies an idempotent function (e.g., max(a,b)).

In various embodiments, the operation "x" can be mapped to different functions, for example, at each "data type level" (e.g., integer, float, string, array, etc.) the mapped function can be different. In one example, the mapped function can be addition for numerals (e.g., int "x" int) for example, and max( ) for strings (e.g., "bar" "x" "z"), In another, "x" as an operator can map to an addToSet function for arrays, and may also include a data type ordering (e.g., a form of maximum on the data type) happening if the operand data types differ.

According to some embodiments, the promotion rules and mapped functions are user definable on the system. Further, each collection (e.g., logical grouping of database data) in the database can have its own set of promotions rules and/or mapped functions. In some examples, the system is configured to restrict use of catamorphic operation the promotions and/or mapped functions are defined cluster-wide or across the distributed database. Thus, the system can be configured to require definition of the operator as global state/metadata before permitting multi-writers and/or catamorphic operation execution.

Figure 1B:
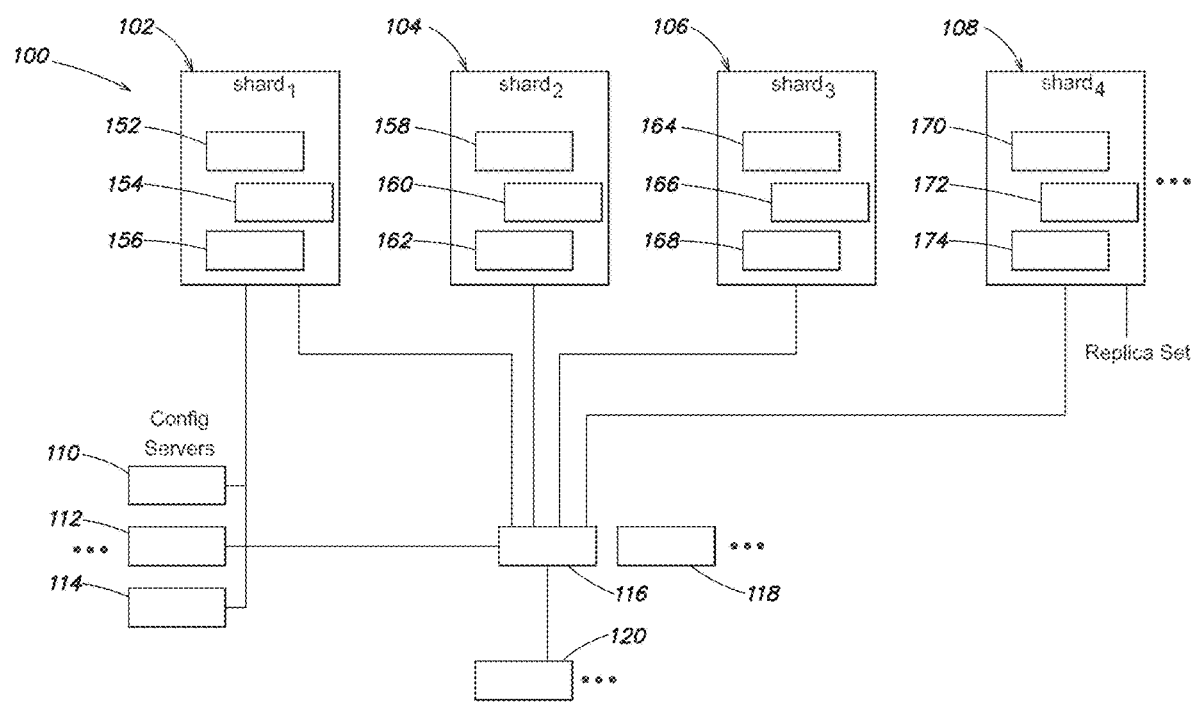
FIG. 1B illustrates a block diagram of an example architecture for a distributed database system, according to aspects of the invention.

FIG. 1B illustrates a block diagram of an example architecture 100 for a distributed database system that provides eventual consistency in the database data via replication of write operations to other nodes hosting the same data. The distributed database system 100 is further configured to minimize the reconciliation logic required for handling multiple writers, where at least some of the multiple writers are responsible for the same data. In some embodiments of the distribute database system, multi-writer processing requires a configuration permitting or enabling multi-writers (e.g., global state setting and/or metadata setting). The multi-writer setting can be enabled across an entire database, or can be enabled for groupings within the database (e.g., logical groupings of data, partitions of data, for specific nodes, groups of nodes, etc.). In various embodiments, once enabled the reduction in conventional reconciliation logic approaches to multiple writers improves the operation of conventional database systems through reduction of computational requirements, reduction in memory allocations, and reduction in processing complexity, among other examples.

Shown in FIG. 1B is a sharded data architecture. In other embodiments, different database architecture can be used in conjunction with catamorphic operators and multi-writer execution. Above in FIG. 1A is an example database without sharding. Other architectures can also employ catamorphic operations to enable multi-writers and avoid issues associated with operation ordering management.

According to another embodiment, another eventual consistency environment can include a single machine with a plurality of central processing units (CPUs). Catamorphic operations can be implemented to ensure consistent final results regardless of the order of execution of the operations on the plurality of CPUs. In another embodiment, virtual machines can be implemented with eventual consistency across the virtual machines. Catamorphic operations in such a setting can reduce ordering complexity and ensure consistent results across the virtual machine as a result of executing a set of operations regardless of order.

In one example, a distributed database 100 is architected to implement database shards. Sharding refers to the process of separating the database into partitions and each partition is referred to as a "shard." Conventional databases such as network-based, file-based, entity-based, relational, and object oriented databases, among other types, can be configured to operate and benefit from the reduced complexity provided by catamorphic operators in multi-writer environments (e.g., whether implementing shards or not). In various embodiments, catamorphic operators can be implemented with any other type of databases, database organization, and/or database management systems thereby reducing complexity in reconciliation and/or ordering operations, and thereby improving the performance of the database system.

As discussed, the distributed database system 100 has been specially configured as a sharded cluster. The sharded cluster is the grouping of shards that collectively represent the data within the database A sharded cluster typically comprises multiple servers (e.g., 102-108) hosting multiple partitions (e.g., 152-174) or shards of data, one or more configuration servers (e.g., 110-114) for metadata management, and shard router processes (e.g., 116-118). Metadata for the sharded cluster can include, for example, information on the ranges of data stored in each partition, information associated with managing the sharded cluster, partition counts, number of shard servers, data index information, partition size constraints, data distribution thresholds, among other options. According to some embodiments, the metadata for the sharded clusters includes information on whether the database accepts distribution of write requests to multiple nodes or system hosting copies of the same data. In some examples, the system accepts configuration settings that enable or disable multiple writer execution for a database, a group of database nodes, subsets of the database, logical groupings of the data within the database, etc. In some embodiments, catamorphic operation can be defined on specific data types, database fields, database documents, or other levels within the database.

In further examples, the distributed database system 100 can include combinations of multi-writer configurations and single writer configurations, for example, on different portions of the database data. In yet other embodiments, some implementation can include both catamorphic operation and non-catamorphic operations that require reconciliation logic. In one example, MVCC can be implemented in conjunction with catamorphic operators. In another example, vector clocks can be implemented for non-catamorphic operations in conjunction with catamorphic operators. In some embodiments, the metadata for sharded clusters includes information on any reconciliation logic, ordering logic, and/or writer selection logic in conjunction with whether the database is configured to accept distribution of catamorphic write requests to multiple nodes or system hosting copies of the same data.

Each shard of data (e.g., 152-174) can be configured to reside on one or more servers executing database operations for storing, retrieving, managing, and/or updating data. Each shard can be hosted as multiple copies of the data hosted on multiple systems. In one example, each shard of data (e.g., 152-174) can be hosted by a replica set (e.g., a group of systems with copies of respective database data). The respective database shards can also include or manage specific collections of data within the distributed database. Collections are logical organizations of subsets of database data. In one example, a collection of documents is a named grouping of the data, for example, a named grouping of documents. The named grouping can be homogenous or heterogeneous. In some embodiments, collections are organizations of database data similar to relational database tables.

Configurations within a sharded cluster can be defined by metadata associated with the managed database and can be reference to as shard metadata. Shard metadata can include information on collections within a given database, the number of collections, data associated with accessing the collections, database key properties for a given collection, ranges of key values associated with a given partition and/or shard within a given collection, systems hosting copies of the same data, to provide some examples.

Shard metadata can also include information on whether multi-writer execution is permitted on the data contained within a shard or across multiple shards. In some embodiments, shard metadata can include information on operators that are permitted. In one example, for multi-writer databases, the metadata can specify what operators (e.g., catamorphic operators) are accepted and cause the system to return errors responsive to improper commands. Further, the database system can validate any write command submitted, and return errors if, for example, a invalid command (e.g., not catamorphic) is requested for a multi-writer database or partition.

In some embodiments, the shard metadata can be managed dynamically to include information on a last write request, processed or received. The information on the last write request can be used in selecting a node in the database to handle subsequent or even simultaneous write requests to the database. A node in the distributed database can be any processing entity that is responsible for a portion of the database data (e.g., primary or secondary nodes) or responsible for management functions associated with the database data (e.g., an arbiter node). In some examples, each node may host sharded or unsharded data. In one example, a node can include a database instance executing on a stand-alone server. In other examples, a node can host multiple database instances. In further examples, a node can be a member of a replica set (e.g., 170-174 making up replica set 176) such as described in U.S. Pat. No. 8,572,031 incorporated herein by reference in its entirety. In further examples, multiple nodes can make up a shard with the distributed database.

Various implementations of shared databases are discussed with respect to co-pending U.S. Patent Application Publication 2012-0254175, incorporated herein by reference in its entirety. The sharded databases discussed may be modified to include multi-writer configurations (e.g., multiple primary nodes in each replica set) and utilize the various aspects and embodiments discussed herein.

Returning to FIG. 1B, the three dots illustrated next to the system components indicate that the system component can be repeated. In some embodiments, adding additional shards, configuration servers, copies of partitions, and/or shard routing processes can increase the capacity of the distributed database system. The shard router processes 116-118 handle incoming requests from clients 120 (e.g., applications, web services, user initiated requests, application protocol interfaces, etc). The router processes 116-118 are configured to provide a transparent interface to handle database requests. In particular, client 120 need not know that a database request is being served by a sharded database. The shard router processes receive such client requests and route the database requests to the appropriate shard(s), e.g., 152-174 on shard servers 102-108.

According to some embodiments, the shard router processes are configured to identify multi-writer database instances, validate a requested write operation is permitted (e.g., check if write request includes a permitted catamorphic operator on a database partition on which multi-writer execution is enabled), and select a node or database instance for handling the write request from a plurality of nodes or database instances (e.g., each node or instance capable of handling the write request).

Various scheduling or selection methodologies can be implemented by the router processes (e.g., select most available, select least load, round robin distribution, etc.). In other embodiments, the router process can be configured to forward a write request to the group of nodes responsible for the data to be written. The group of nodes can also be configured to select the most appropriate member of the group to process the write request. In one example, each node of a distributed database includes a database manager program and/or database daemon for accepting and responding to data requests (including, for example, write requests). The database manager daemon can also be configured to select within a group of nodes responsible for a database partition which node should handle a given write request. In some embodiments, the router processes and the database manager daemons can cooperate in selection of a node to handle the write request.

Once a valid write request is received at node hosting the data, the node executes the write operation according to execution logic defined, for example, with the catamorphic operator. According to one embodiment, in a multi-writer enabled environment, a single catamorphic operator is defined. The single catamorphic operator is associated with execution logic that defines promotion rules between data types, for example, for combining and progressing through any of the data types available within the multi-writer database. In some embodiments, the execution logic associated with the catamorphic operator is defined on all write nodes in the database. In other embodiments, a database router layer can be configured to distribute the execution logic with the operation to, for example, a database manager process at the selected write node.

An example model for the execution logic of a catamorphic operator "x" includes the following rules:

```
null x null -> null
number x number -> addition
string_a x string_b ->
    max(string_a, string_b)
        "" x "foo" -> "foo"
        "foo" x "bar" -> "foo"
        "food" x "foo" -> "food"
date x date -> max value
bool x bool -> OR
```

According to some aspects, various models can define different operations (e.g., number x number→subtraction), however in some examples, the model for execution logic must remain the same, at least while the database is available and writable. According to another aspect, a feature of some execution models includes definition of a sequence of promotions between data types existing in the database or available to be used on data available in the database. In some embodiments, sequence of promotions defines a hierarchy or creates an ordering of the data types available in the database. According to one embodiment, the promotion can be defined generally as A×B (where A and B are different types)→the larger type's value.

Another example execution model includes:

```
null x false -> false                        // returns Boolean
false x true -> true                         // returns Boolean
true x 3 -> 3                                // returns integer
(int) 3 x 2.0123 (float) -> 2.0123           // returns float
date_a x date_b -> max(a,b)                  // return date
int x date -> date                           // return date
date x string -> string                      // return string
2.0123 (float) x "foo" (string) -> "foo"     //returns string
"foo" x { } (array) -> { }                   // returns array
[ ] x "bar" -> [ "bar" ]   // addToSet
["bar"] x "bar" -> ["bar"]
["bar"] x "z" -> ["bar","z"] // <- set, not array maps to addToSet function
```

According to the above execution model—the following operations reach the same result upon execution regardless of execution order and regardless of being executed on the same copy of the data so long as all the operations are replicated through any copies of the data. Thus, no reconciliation of the operations and/or their received order is required. In various embodiments, the system can be configured to identify duplicate operations and ensure duplicates are skipped. As part of the definition of promotion rules/promotion hierarchy, defined are operations to be performed based on target data type and operand data type. For example, the system maps "true"—target data of Boolean type (catamorphic operator) "3"—operand of data type integer to the higher order data type integer and returns the integer data type and corresponding value "3." In other embodiments, other hierarchies can order data types differently and associate data type combinations with different functions.

To provide another example, given three nodes A, B, and C hosting the same data, the following operations yield the same data regardless of processing node and execution order.

Node A
write op: [ ] x "bar" -> ["bar"] // [ ] identifies the target data: set with initial state empty
Node B
write op: [ ] x "z" -> ["z"]   // [ ] identifies the target data: set with initial state empty

```
Node A
Replication of operation executed on B from above: [ ] x "z" -> ["bar","z"]
Node B
Replication of operation executed on A above: [ ] x "bar" -> ["bar","z"] // same
                                        // result regardless of execution order
```

Considering Node C, the replication operations can be received and executed in either order and return a consistent state at the conclusion of the execution:

```
Node C
Replication of operation: [ ] x "bar" -> ["bar"]
Replication of operation: [ ] x "z" -> ["bar","z"]
OR
Replication of operation: [ ] x "z" -> ["z"]
Replication of operation: [ ] x "bar" -> ["bar","z"] // same result regardless of execution
                                        // order
```

Further promotion or execution models can combine any of the rules above with additional data type promotion rules or additional execution rules within data types.

In one example, a distributed database is implemented using documents as a basic organizational structure of the data stored in the distributed database. A catamorphic operator can be defined for the database—wherein the operator (e.g., "x") executes a union operations on a first document as a first argument and a second document as a second argument.

doc_a x doc_b→union (recursively)

According to one embodiment, the elements stored within the documents are treated as sets and not as ordered sets. Specifically, the documents are operated on as if no particular field order is defined for either document. In one alternative—if a well-defined order is established for the documents referenced by the arguments (e.g., doc_a and doc_b referenced above), then the union operation can proceed while respecting the well-defined ordering.

In another embodiment employing the execution model defined above, the following write operation can be received at any node of a group of writable nodes and same result returned:

```
Operation on data item (i), initial state a:3, b:7
receive operation: x {a:5, b:"hi", c:true};
execute:{a:3, b:7} x {a:5, b:"hi", c:true} -> { a:5, b:"hi", c:true}
According to another example, a data partition hosted by five nodes
(i.e., each of the 5 nodes hosts a copy of the data in the database
partition) has following common starting point:
  { _id:2, name:"joe", likes:"film" }. The following write operations
can be received and executed by any of the five nodes in any order:
  operations (no particular order):
  { name : "Joe" }
  { age : 33 }
  { active : true }
  { active : false }
  { likes : ["tennis"] }
  { likes : ["golf"] }
```

In the example discussed above, each node is configured to propagate operations executed on its respective copy of the data of the data instance to the other nodes. For example, as any one of the nodes receives any one of the operations above—the receiving node executes the received operation on its copy of the data. No checking, re-ordering, or reconciliation is required in the above example as each node updates its respective data. In other examples, minimal validation or checking can include duplicate operation detection and skipping. Further, in some embodiments, no restrictions are place on the selection of a write processing node. In an eventually consistent architecture with asynchronous replication, each node records executed operations to an operation log and forwards or makes available the new log entries to the other members (e.g., of the five node group). As the operation log entries are received or polled, each receiving/polling node executes the logged operation. The result, once the client side operations cease, is that eventually each node reflects a consistent state of the database.

In some examples, the five nodes are members of a replica set each configured for primary operation. A further modification of the replica set model is that primary nodes replicate operations to other primary nodes within a given group responsible for a set of data. In some examples, the five nodes are configured as a replica set that permits writes to occur on any node hosting a copy of the data within the replica set with each configured to replicate write operations to the remaining members of the set. Based on the execution models discussed above: the following result will be reflected in the data of all the database copies on execution and once replication is complete:
  result: {_id:2, active: true, age: 33, likes: ["film", "golf", "tennis"], name: "Joe"}

According to some embodiments, during execution of the write operations each of the nodes (for example, of the five member replica set) can have inconsistent copies of the data targeted by the six operations until the operations are replicated between the nodes. Under eventual consistency guarantees, the inconsistency is permitted in the near term and facilitates the high availability to the distributed database for client write requests.

According to another example, the distributed database can execute catamorphic operations on data values including timestamping patterns:
  if "x" is defined such that doc_a x doc_b→doc_b iff
      doc_b>doc_a
    where ">" is defined as an approximation or lexicographical compare of the field names (i.e. field names count for this example in the ordering)
Thus, in this example, the "x" operator is defined so that the associated execution logic does not provide a union operator.

In an example execution:

```
{ x : 2 } x { y : false } -> { y : false }
example of the pattern then:
starting point:
    { name : "joe",
      address : {
        201502012359 :
            { city : "zzz", state : "ny" }
        }
    }
operation:
{
    address : {
        201502020803 :
            { city : "san diego", state : "ca" }
        }
    }
}
result:
    { name : "joe",
      address : {
        201502020803 :
            { city : "san diego", state : "ca" }
        }
    }
```

According to other embodiments, the promotion model can include definition of virtual data types. For example, multiple integer data types can be defined and an associated hierarchy of the virtual data types can be implemented to provide greater flexibility in the promotion execution.

One example model includes three types for integer data. The model can define promotion operations and progression between the types to allow additional implementation of, for example, arithmetic functions or other operations.

```
int_type_1
int_type_2
int_type_3
{ x : 3 <int_type_1> }
{ x : 3 <int_type_2> }
{ x : 3 <int_type_3> }
```

In some embodiments, multiple virtual data types can be defined for each data type in the database. Various operations and hierarchies can be defined to allow for execution of promotions within a data type (e.g., int, float, string, date, etc.). For example, different integer types can be added together, and in further examples, different integer types can be added together with respective promotions between the additional types. In one embodiment, these shadow data types or extension data types are implemented as part of the defined catamorphic operation and promotion hierarchy so that any existing data type in the database can also have internal data type promotions and associated operations.

Figure 2:
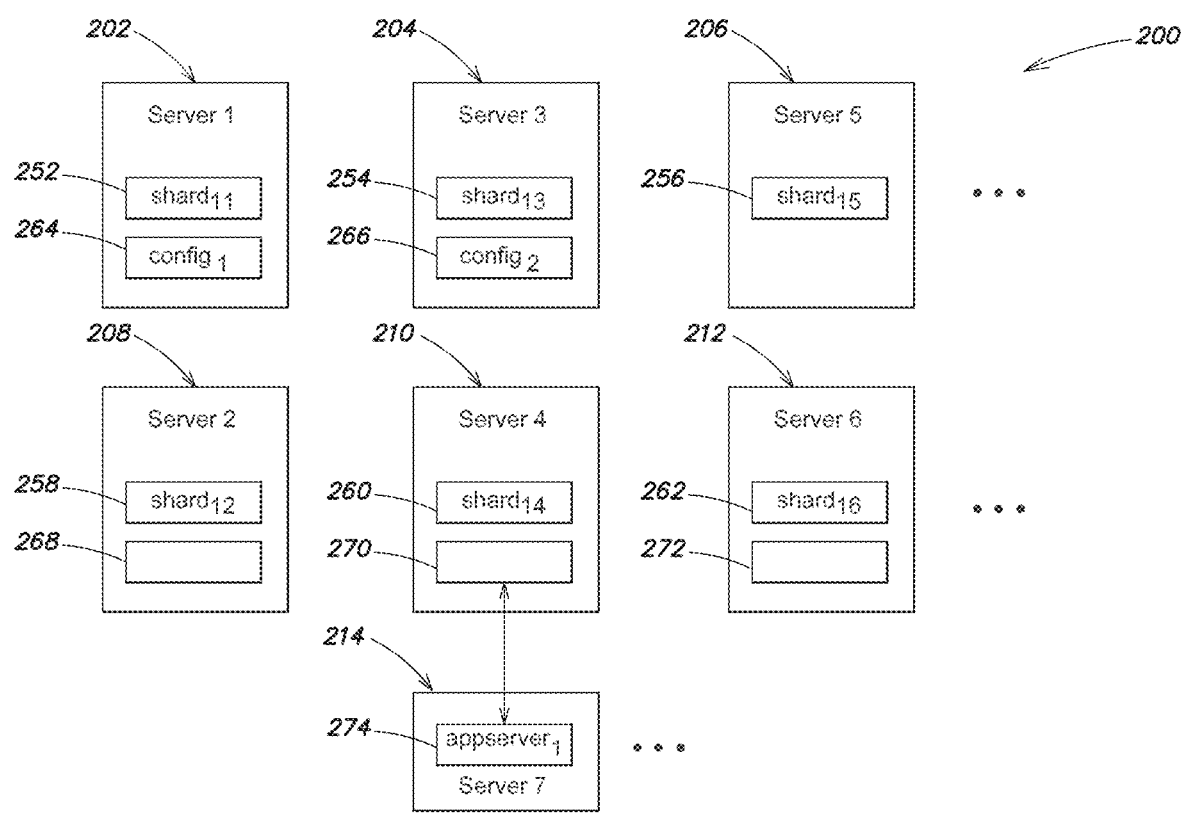
FIG. 2 illustrates a block diagram of an example architecture for a distributed database architected with database shards, according to aspects of the invention.

As discussed, FIGS. 1A-B illustrate example architectures for a distributed database. In some embodiments, various configurations of the routing processes and the shard servers are possible. Shown in FIG. 2 is a block diagram of another example architecture for a distributed database. FIG. 2 illustrates an example configuration of a sharded cluster 200. Servers 202-212 host the various shards of data that make up the data of a distributed database. Each shard 252-262 can be assigned an associated versioning number that assist the system in tracking various versions of the data. Shown are version number 11, 12, 13, 14, 15, and 16. In this example these versions numbers represent multiple copies of first partition 1.

The versioning numbers can be used during creation of new shards and, in some examples, can be assigned only when the data associated with a new shard has been tested correct. Further logic can be implemented to facilitate data availability and some embodiments to ensure write availability. For example, a router process can distribute write request across the six copies of the first partition based on availability, load balancing consideration, etc.

According one embodiment, a router process can distribute write operations to multiple copies of any number of partitions of the data. In some examples, replication operations between the systems hosting the multiple copies ensure that a consistent state in the database is reached. The router process can be configured to check a database state or maintain information on the database, database partitions, and/or logic groupings of the database data. If multiple writers are permitted, the router process can validate a requested operation (e.g., received from a client at 274) to ensure that a valid catamorphic operator is being used. Otherwise, the router process can be configured to return errors in response to an invalid request.

Configuration processes 264 and 266 are executed on servers 202-204. In some embodiments, the configuration processes can control the metadata information associated with the sharded cluster. In one example, an end user or administrator can access the configuration metadata and enable or disable multi-writer configurations. Further, the boundaries of the multi-writer configuration can be set (e.g., for the database, for a partition, for a collection, multiple collections, multiple partitions, etc.). The routing processes 268-272, for example, running on servers 208-212 can receive state information from the configuration processes 264-266. The router processes can use the state information to allow multi-writer distribution of write operations.

As shown, server 214 hosts the client application server 274 which manages client requests. The client requests are communicated to a routing process, as illustrated, process 270, which, in some examples, can determine from the received request, which database shard is needed to respond. In other embodiments, multiple routing processes can be implemented.

Routing process 270 forwards the request to the appropriate shards. The shards capture any relevant data, perform any write requests, and return the results of the execution (if necessary) to the calling routing process. The routing process, e.g., 270, can be configured to merge the results, as necessary, and communicate the result to the client appserver 274.

Figure 3:
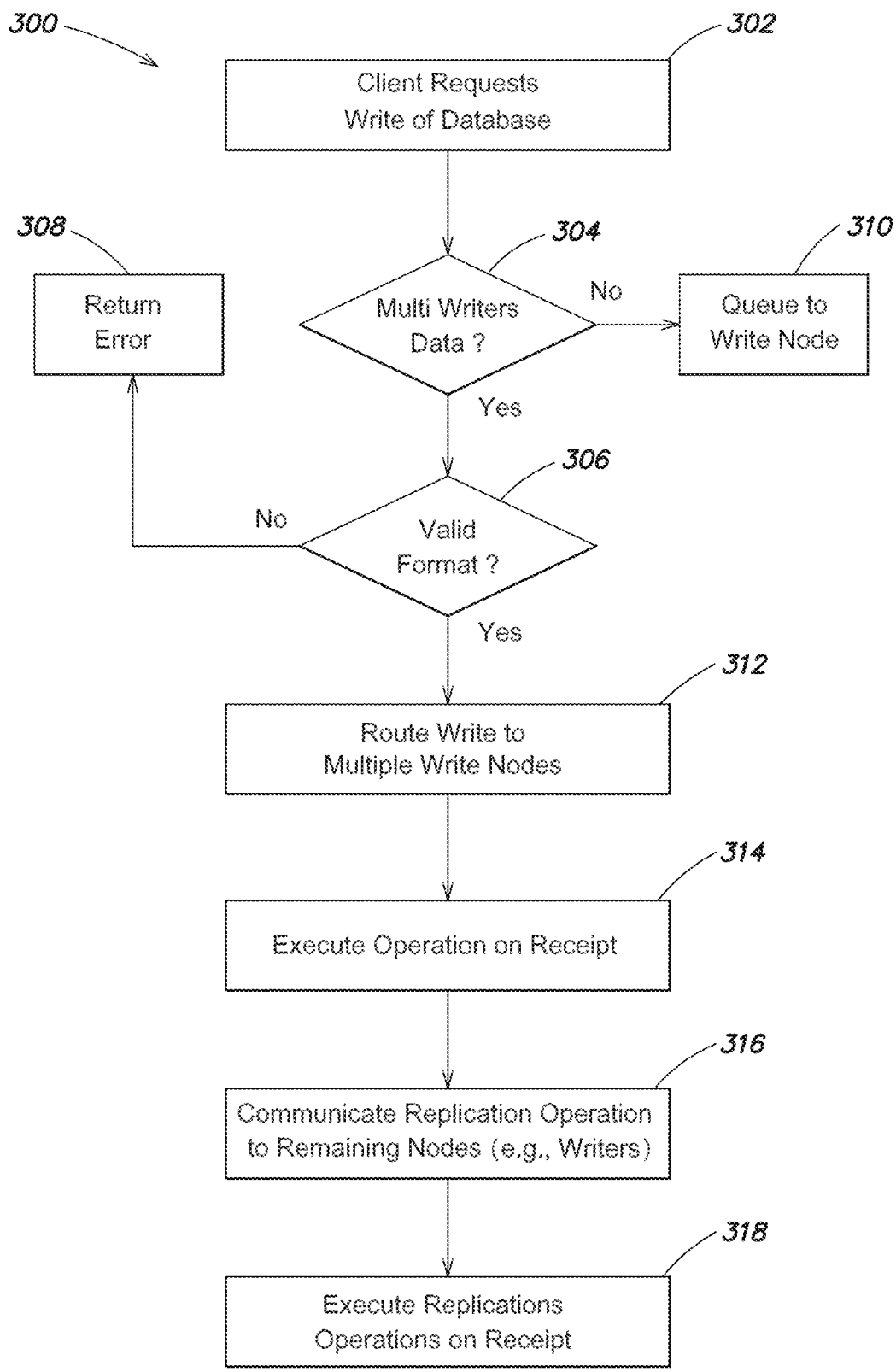
FIG. 3 illustrates an example process flow for processing catamorphic operators, according to aspects of the invention.

FIG. 3 illustrates an example process flow 300 for executing distributed write operations. Process 300 can be executed on multi-writer databases where groups of multiple write nodes are responsible for respective copies of the same data. In other examples, process 300 can be executed on multi-writer partitions where groups of multiple nodes have write authority over respective copies of the partition of data. In yet other examples, process 300 can be executed with logical groupings of data and multiple nodes have write authority to the logical groupings. The process 300 begins at 302 with a client write request on the database. If the nodes managing the data being written to are configured for multiple writers, 304 YES, the write request can be analyzed to determine if it is a valid request at 306. In some examples, a write request is analyzed to determine if the write request includes or defines a valid catamorphic operator, if so the request is valid 306 YES and process 300 can continue. If not 306 NO, the process 300 returns an error at 308.

In some embodiments, an application layer can manage validity checking on a client operation. In further embodiments, the client operation can be validated as the client is entering the operation. In other embodiments, data routing processes can be responsible for determining if a write request is being directed to data managed by multiple writers. For example, the data routing processes can executed steps 304 and/or 306. If the target data is not enabled for multiple writers, process 300 can end at 310 with routing of the write request to a single write node responsible for the target data. In some implementations, the process 300 is executed in a mixed database environment where some the data is managed by multi-writers and other portions of the data is managed by single writer nodes (e.g., with replication from single writer to secondary nodes). If the write targets multi-writer data 304 YES, and the request is valid 306 YES, the process 300 continues at 312 with routing of the write request to a selected one of the multiple writer nodes.

Step 312 can include sub-processes executed to select one of a group of multi-writer nodes. In some examples, a least loaded node can be selected. In other examples, a least recently used ("LRU") write node can be selected. In further examples, the write node selection algorithm can be location aware and selection can be weighted based on proximity. In some embodiments, step 312 can be executed by data routing processes in the database. In other embodiments, a routing process can forward the write requests to a group of nodes responsible for the target data and one or more data manager processes can select a write node (e.g., based on load or availability, among other options). Once the write node is selected, the write node executes the write operation on receipt at 314. As discussed, because the write operation has been verified catamorphic (e.g., valid operation determined at 306) any order of execution of writes does not impact the result of a series of write operations. Multiple write operations can be received and processed by a group of write nodes and eventually the written data becomes consistent on each of the write nodes.

For example, each of the write nodes in the group can be configured to replicate written operations to the remaining members of the group managing copies of target data. For example, at 316, the select write node copies the executed write operation to an operation log, and communicates the new operations for the operation log to the other members of the group managing the target data. At 318, the remaining members of the group execute the operation from the operation log responsive to receipt. In some implementation, the order of receipt and execution of operations via an operation log is not relevant to the resulting data. For example, if multiple writes are processed by the write nodes in a group. The ordering of the write and replication operations does not affect the ultimate state of the data once all the operations have been executed by the write nodes. Based on the definition of the catamorphic operator, all of the writer nodes' data reaches a consistent state, eventually. FIG. 4 illustrates an example of pseudo-code, including code for distributing writes across multiple write nodes.

According to some embodiments, the distributed database system can include an administrative component that facilitates generation of user defined or selected catamorphic operators. For example, a user or an administrator can define a catamorphic operator that specifies data type promotion rules, operations for homogenous data, etc. The administrative component can test the defined operator and promotion rules to validate the data type hierarchy specified by the promotion rules. Further, the administrative component can extract data types from given databases or partitions and evaluate whether the defined hierarchy address all the data types available in the database or partition. In one example, the administrative component is configured to execute each of the defined promotions on test values (e.g., predefined, randomly selected, etc.) and perform the same executions in different order. If a user submitted set of promotion rules and associated operations are well-defined, the execution under different order will yield the same result. If the results is the same regardless of the execution order the administrative component can indicate to the user that validation testing has been passed. The system can also provide educational information, that although the testing has past comprehensive testing has not been executed. In another embodiment, the administrative component also tests coverage of a promotion hierarchy to ensure all data types are represented and that a path exists from each data type to the highest order data type in the promotion rules/hierarchy. In various embodiments, the test executions and/or validation of coverage can be implemented on the system to reduce user error and improve execution efficiency of the database, among other reasons.

In some embodiments, the administrative component is configured present templates of catamorphic operators and promotion models. A user can then select from defined templates and/or modify defined templates to include all data types specified by the user's database. In some examples, the administrative component can automatically select a promotion model template responsive to matching data types within a given database or partition.

According to one embodiment, each shard server in a sharded cluster (e.g., FIG. 1B) can be implemented as a replica set (e.g., shard server 108 and/or FIG. 1A). A replica set can be configured to perform asynchronous replication across a series of nodes, with various processes implemented to handle recovery of primary node operations within the replica set. Such a configuration insures high availability of the data replicated throughout the replica set. By modifying the replica sets as disclosed here high availability of data reads can also be accompanied by high availability for data writes. In one example, a replica set can be a set of n servers, frequently three or more, each of which contains a replica of the entire data set for the given shard. One of the n servers in a replica set will always be a primary node. If the primary node replica fails, the remaining replicas are configured to automatically elect a new primary node. Each server 202-212 can be implemented as a replica set, for example, as discussed in co-pending application Ser. No. 14/064,705 entitled "METHOD AND APPARATUS FOR MAINTAINING REPLICA SETS" filed on Oct. 28, 2013, published as US2014/0164831 incorporated herein by reference in its entirety. Other replication methodologies can be used to insure each shard remains available to respond to database requests. In some examples, other multi-node systems can be used to provide redundancy within a sharded database. In others, various distributed architectures can be used for each shard within the sharded cluster.

The various functions, processes, and/or pseudo code described herein can be configured to be executed on the systems shown by way of example in FIGS. 1-2. The systems and/or system components shown can be specially configured to execute the processes and/or functions described. Various aspects and functions described herein, in accord with aspects of the present invention, may be implemented as specially configured hardware, software, or a combination of hardware and software on one or more specially configured computer systems. Additionally, aspects in accord with the present invention may be located on a single specially configured computer system or may be distributed among one or more specially configured computer systems connected to one or more communication networks.

For example, various aspects, components, and functions (e.g., shard, node, data router, application layer, etc.) may be distributed among one or more special purpose computer systems configured to provide a service to one or more client computers, mobile device, or to perform an overall task as part of a distributed system. Additionally, aspects may be performed on a client-server or multi-tier system that includes components or engines distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 5:
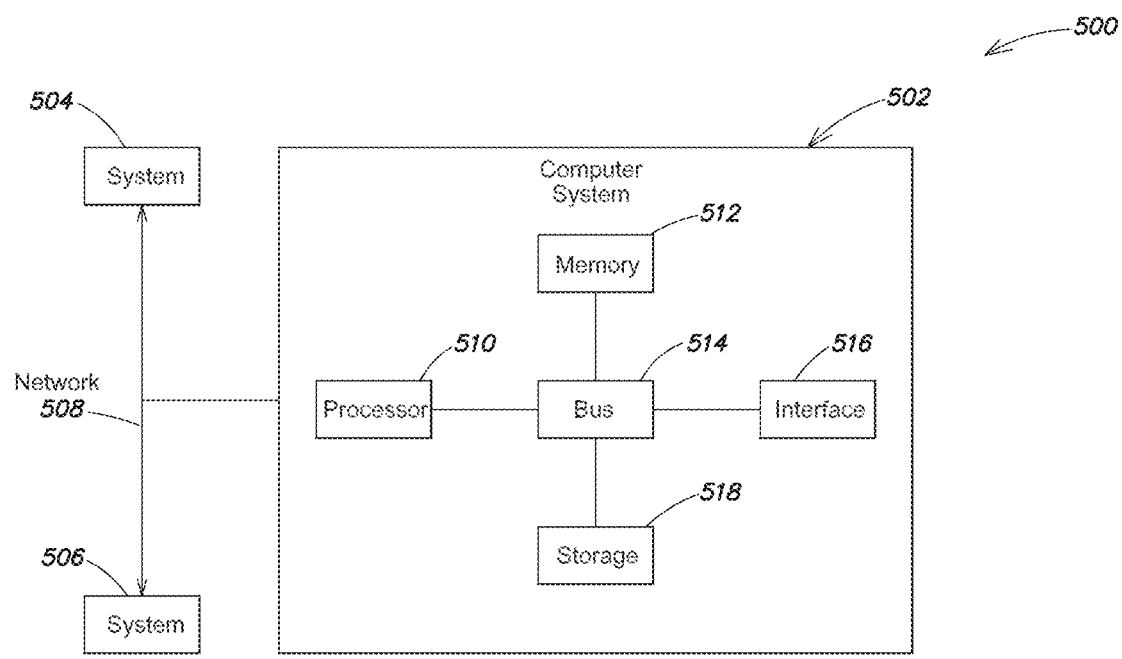
FIG. 5 is a block diagram of an example computer system specially configured to host one or more elements of a distributed database system on which various aspects of the present invention can be practiced.

Referring to FIG. 5, there is illustrated a block diagram of a distributed special purpose computer system 500, in which various aspects and functions are practiced (e.g., including a routing component (including for example a routing process), a validation component (e.g., tests for valid catamorphic operators), an administration component (e.g., enables multi-writer architectures and/or tests definition of catamorphic operators), a replication component (e.g., captures executed write operations and distributes to nodes hosting the same copy of data), among other options). As shown, the distributed computer system 500 includes one more special purpose computer systems that exchange information. More specifically, the distributed computer system 500 includes computer systems 502, 504 and 506. As shown, the computer systems 502, 504 and 506 are interconnected by, and may exchange data through, a communication network 508. For example, a segment of a distributed database can be implemented on 502, which can communicate with other systems (e.g., 504 and 506), which host other or remaining portions of the database data.

In some embodiments, the network 508 may include any communication network through which computer systems may exchange data. To exchange data using the network 508, the computer systems 502, 504 and 506 and the network 508 may use various methods, protocols and standards, including, among others, TCP/IP, or other communication standard, and may include secure communication protocols VPN, IPsec, etc. To ensure data transfer is secure, the computer systems 502, 504 and 506 may transmit data via the network 508 using a variety of security measures including, for example, TLS, SSL or VPN or other standard. While the distributed computer system 500 illustrates three networked computer systems, the distributed computer system 500 is not so limited and may include any number of computer systems and computing devices, networked using any medium and communication protocol.

As illustrated in FIG. 5, the special purpose computer system 502 includes a processor 510, a memory 512, a bus 514, an interface 516 and data storage 518 and further includes any one or more of the component discussed above to implement at least some of the aspects, functions and processes disclosed herein, as either a stand-alone system or part of a distributed system. In some embodiments, the processor 510 performs a series of instructions that result in manipulated data. The processor 510 may be any type of processor, multiprocessor or controller. The processor 510 is connected to other system components, including one or more memory devices 512, by the bus 514.

The memory 512 stores programs and data during operation of the computer system 502. Thus, the memory 512 may be a relatively high performance, volatile, random access memory such as a dynamic random access memory (DRAM) or static memory (SRAM) or other standard. However, the memory 512 may include any device for storing data, such as a disk drive, hard drive, or other non-volatile storage device. Various examples may organize the memory 512 into particularized and, in some cases, unique structures to perform the functions disclosed herein. These data structures may be sized and organized to store values for particular to specific database architectures and specific data types, and in particular, may include standardize formats for organizing and managing data storage.

Components of the computer system 502 are coupled by an interconnection element such as the bus 514. The bus 514 may include one or more physical busses, for example, busses between components that are integrated within the same machine, but may include any communication coupling between system elements including specialized or standard computing bus technologies such as IDE, SCSI, PCI and InfiniBand or other standard. The bus 514 enables communications, such as data and instructions, to be exchanged between system components of the computer system 502.

The computer system 502 also includes one or more interface devices 516 such as input devices, output devices and combination input/output devices. Interface devices may receive input or provide output. More particularly, output devices may render information for external presentation. Input devices may accept information from external sources. Examples of interface devices include keyboards, mouse devices, microphones, touch screens, printing devices, display screens, speakers, network interface cards, etc. Interface devices allow the computer system 502 to exchange information and to communicate with external entities, such as users, vendors, and other systems.

The data storage 518 includes a computer readable and writeable nonvolatile, or non-transitory, data storage medium in which instructions are stored that define a program or other object that is executed by the processor 510. The data storage 518 also may include information that is recorded, on or in, the medium, and that is processed by the processor 510 during execution of the program. More specifically, the information may be stored in one or more data structures specifically configured to conserve storage space or increase data exchange performance.

The instructions stored in the data storage may be persistently stored as encoded signals, and the instructions may cause the processor 510 to perform any of the functions described herein. The medium may be, for example, optical disk, magnetic disk or flash memory, among other options. In operation, the processor 510 or some other controller causes data to be read from the nonvolatile recording medium into another memory, such as the memory 512, that allows for faster access to the information by the processor 510 than does the storage medium included in the data storage 518. The memory may be located in the data storage 518 or in the memory 512, however, the processor 510 manipulates the data within the memory, and then copies the data to the storage medium associated with the data storage 518 after processing is completed. A variety of components may manage data movement between the storage medium and other memory elements and examples are not limited to particular data management components. Further, examples are not limited to a particular memory system or data storage system.

Although the computer system 502 is shown by way of example as one type of computer system upon which various aspects and functions may be practiced, aspects and functions are not limited to being implemented on the computer system 502 as shown in FIG. 5. Various aspects and functions may be practiced on one or more specially configured computers having different architectures or components than that shown in FIG. 5 which can be modified to include the specially purpose components and/or functions discussed. For instance, the computer system 502 may include specially programmed, special-purpose hardware, such as an application-specific integrated circuit (ASIC) tailored to perform any one or more operations disclosed herein (e.g., validating received operations, routing write requests, replicating operations, among other examples). While another example may perform the same function(s) using a grid of several computing devices running MAC OS System X with Motorola PowerPC processors and several specialized computing devices running proprietary hardware and operating systems.

The computer system 502 may be a computer system including an operating system that manages at least a portion of the hardware elements included in the computer system 502. Additionally, various aspects and functions may be implemented in a non-programmed environment, for example, documents created in HTML, XML or other format that, when viewed in a window of a browser program, can render aspects of a graphical-user interface or perform other functions.

According to one embodiment, a distributed database can include one or more data routers for managing multi-writer databases. The one or more data routers can receive client request (e.g., user entered data requests, data requests received from an application programming interface (API), or other computing entity requests) and route request to appropriate servers, systems, or nodes within the distributed database. In some embodiments, one or more data routers can be configured to manage multiple writer configurations of the distributed database. In other embodiments, the data routers can deliver requests to local entities (e.g., a replica set) which can distribute operations (e.g., including write operations) to any member of the replica set.

In some examples, the distributed database may be configured to only permit multi-writer execution for specific collections (e.g., a logical organization of parts of the database) within the distributed database. In other examples, a distributed database system can include separate database instances and each instance and configuration can be managed separately (e.g., multi-writer enabled or disabled). In some implementations, the one or more data routers may reference configuration files to determine if multi-writer operations can be executed responsive to a client request. In further examples, the data router can limit operations on multi-writer database collections such that only the one or more catamorphic operations are permitted.

Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g., specialized hardware, executable code, data structures or data objects, that are configured to perform the functions described herein.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

Use of ordinal terms such as "first," "second," "third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A database system for managing distributed write operations, the system comprising:
   at least one processor operatively connected to a memory for executing system components;
   a database comprising a plurality of copies of data hosted on a plurality of database nodes;
   a data routing component, executed by the at least one processor, configured to:
      evaluate received write requests;
      identify a multi-writer operation, responsive to identifying a multi-writer operator within a respective write request;
      route the write request for execution on one of the plurality of database nodes;
   a database manager component, executed by the at least one processor, configured to:
      identify a target data type and operand data type referenced by the multi-writer operation, wherein the multi-writer operation can be executed by a plurality of primary nodes hosting at least some of the data and the multi-writer operation executed on respective primary nodes are replicated to a plurality of secondary nodes hosting at least the data of an associated primary node, and replication is executed at least in part without reconciliation of order of receipt based at least in part on a data type promotion hierarchy;
      map the multi-writer operation to a respective function defined within the data type promotion hierarchy, based on, at least, the target data type and the operand data type identified in the multi-write operation, the data type promotion hierarchy comprising a first data type occupying a first position on the data type promotion hierarchy and a second data type occupying a second position on the data type promotion hierarchy, wherein:
         a combination of the first data type with the second data type yields a promotion between data types;
         the promotion hierarchy defines at least one promotion between a data type not configured to express non-numerical values and a data type configured to express non-numerical values; and
      execute the respective function on one of the plurality of nodes hosting target data of the multi-write operation.

2. The system of claim 1, wherein the data routing component is further configured to:
 determine multiple writer capability for the target data of the write request;
 permit execution of the write request responsive to determining the target data is associated with data configured for multiple writer execution.

3. The system of claim 1, further comprising an administration component configured to enable or disable multi-writer execution on the distributed database.

4. The system of claim 1, wherein the data routing component is further configured to assign a unique identifier to a received catamorphic write operation.

5. The system of claim 1, further comprising a user interface component, executed by the at least one processor, configured to generate a user interface displayed to a user, wherein the user interface is configured to accept definition of a multi-writer operation, a plurality of executable promotions between data types in the distributed database, wherein the executable promotions establish an ordering of the data types.

6. The system of claim 1, wherein further comprising an administration component configured to test definition of the multi-writer operation.

7. The system of claim 1, wherein the database manager component is further configured to replicate the executed multi-writer operation on remaining nodes hosting copies of the target data the multi-writer operation.

8. The system of claim 1, wherein the database manager component is further configured to replicate write operations received by the distributed database under an eventual consistency model for at least a portion of the data in the distributed database.

9. The system of claim 2, wherein the data routing component is further configured to select a node for executing the multi-writer operation from a group of nodes hosting copies of the same database data.

10. The database of claim 9, wherein each node in the group of nodes is configured to execute multi-writer operations as the multi-writer operations are received.

11. The database of claim 9, wherein each node in the group of nodes is configured to execute multi-writer operations as the multi-writer operations are received irrespective of an order of receipt of the multi-writer operations at respective nodes.

12. The system of claim 3, wherein the system further comprises a database manager process configured to identify duplicate write operations and prevent duplicate execution.

13. The system of claim 6, wherein the administration component is further configured to execute the plurality of promotions between the data types on test data types and test values to evaluate a final result based on multiple orderings of the plurality of promotions.

14. The system of claim 13, wherein the system is configured to reject the definition of the multi-writer operations responsive to a failed validation.

15. The system of claim 6, wherein the administration component is further configured to validate coverage of the plurality of executable promotions by testing each data type in at least a multi-writer enabled portion of the distributed database for inclusion in the plurality if executable promotions.

16. The system of claim 15, wherein the administration component is further configure to notify the user of any failed testing and identify in the notification the cause of failed testing.

17. The system of claim 8, wherein the system is further configured to limit execution of multi-writer operations to at least the portion of the data replicated under the eventual consistency model.

18. A computer implemented method for managing distributed write operations, the method comprising:
 evaluating, by at least one processor, received write requests for a database comprising a plurality of copies of data hosted on a plurality of database nodes;
 identifying, by the at least one processor, a multi-writer operation, responsive to identifying a multi-writer operator within a respective write request;
 routing, by the at least one processor, the write request for execution on one of the plurality of database nodes;
 identifying, by the at least one processor, a target data type and operand data type referenced by the multi-writer operation, wherein the multi-writer operation can be executed by a plurality of primary nodes hosting at least some of the data and the multi-writer operation executed on respective primary nodes are replicated to a plurality of secondary nodes hosting at least the data of an associated primary node, and replication is executed at least in part without reconciliation of order of receipt based at least in part on a data type promotion hierarchy;
 mapping, by the at least one processor, the multi-writer operation to a respective function defined within the data type promotion hierarchy, based on, at least, the target data type and the operand data type identified in the multi-write operation, the data type promotion hierarchy comprising a first data type occupying a first position on the data type promotion hierarchy and a second data type occupying a second position on the data type promotion hierarchy, wherein:
  a combination of the first data type with the second data type yields a promotion between data types;
  the promotion hierarchy defines at least one promotion between a data type not configured to express non-numerical values and a data type configured to express non-numerical values; and
 executing, by the at least one processor, the respective function on one of the plurality of nodes hosting target data of the multi-write operation.

19. The method of claim 18, further comprising:
 replicating write operations received by the distributed database under an eventual consistency model for at least a portion of the data in the distributed database; and
 limiting execution of multi-writer operations to at least the portion of the data replicated under the eventual consistency model.

20. A non-transitory computer-readable medium having computer-readable signals stored thereon that define instructions that, as a result of being executed by a computer, instruct the computer to perform a method for managing distributed write operations, the method comprising:
 evaluating received write requests for a database comprising a plurality of copies of data hosted on a plurality of database nodes;
 identifying a multi-writer operation, responsive to identifying a multi-writer operator within a respective write request, wherein the multi-writer operation can be executed by a plurality of primary nodes hosting at least some of the data and the multi-writer operation executed on respective primary nodes are replicated to a plurality of secondary nodes hosting at least the data of an associated primary node, and replication is executed at least in part without reconciliation of order of receipt based at least in part on a data type promotion hierarchy;

routing the write request for execution on one of the plurality of database nodes;

identifying a target data type and operand data type referenced by the multi-writer operation;

mapping the multi-writer operation to a respective function defined within the data type promotion hierarchy, based on, at least, the target data type and the operand data type identified in the multi-write operation, the data type promotion hierarchy comprising a first data type occupying a first position on the data type promotion hierarchy and a second data type occupying a second position on the data type promotion hierarchy, wherein:

a combination of the first data type with the second data type yields a promotion between data types;

the promotion hierarchy defines at least one promotion between a number based data type not configured to express non-numerical values and a non-number based data type configured to express non-numerical values; and executing, the respective function on one of the plurality of nodes hosting target data of the multi-write operation.

* * * * *